United States Patent [19]

Shimizu

[11] 4,085,829

[45] Apr. 25, 1978

[54] DISC BRAKE

[75] Inventor: Kazuaki Shimizu, Fujisawa, Japan

[73] Assignee: Nissan Motor Co., Ltd., Japan

[21] Appl. No.: 750,673

[22] Filed: Dec. 15, 1976

[30] Foreign Application Priority Data

Dec. 19, 1975 Japan .............................. 50-151291

[51] Int. Cl.² .......................................... F16D 55/228
[52] U.S. Cl. .................................... 188/72.5; 188/73.4
[58] Field of Search ............................ 188/72.5, 73.4; 308/238

[56] References Cited

U.S. PATENT DOCUMENTS

| 3,536,167 | 10/1970 | Rath ...................................... 188/73.4 |
| 3,881,791 | 5/1975 | Hentschel ............................. 308/238 |

FOREIGN PATENT DOCUMENTS

| 2,325,399 | 11/1973 | Germany .............................. 303/238 |
| 1,158,903 | 7/1969 | United Kingdom ................ 188/73.4 |

*Primary Examiner*—George E.A. Halvosa

*Attorney, Agent, or Firm*—Robert E. Burns; Emmanuel J. Lobato; Bruce L. Adams

[57] ABSTRACT

The invention provides a disc brake in which a tongue on a yoke is securely received in a blind bore formed in a piston of a hydraulic actuator by means of a pair of insert members of a resilient material. The insert members have grooves, respectively, for receiving the tongue. Each insert member has a part-cylindrical surface and the undistorted radius of curvature of the part-cylindrical surface of each insert member is greater than the radius of curvature of a cylindrical wall of the blind bore to permit easy insertion, during assembly, of the pair of insert members into the blind bore. When the tongue is inserted into the grooves of the insert members disposed in the blind bore, the part-cylindrical surfaces of the insert members are urged into firm engagement with the cylindrical wall and the insert members are caused to be distorted in such a manner as to urge the side walls of the grooves into firm engagement with the tongue.

6 Claims, 3 Drawing Figures

DISC BRAKE

FIELD OF THE INVENTION

The present invention relates to a disc brake provided with an actuator operative between a directly operated pad and a yoke adapted to support an indirectly operated pad.

DESCRIPTION OF THE PRIOR ART

A known disc brake as described in British Patent Specification Ser. No. 1,150,642 has a construction in which an operative component of an hydraulic actuator has a cylindrical bore receiving a ring-like insert member. The insert member supports and locates an inwardly directed tongue formed on a yoke. It is moulded from a synthetic plastics material having anit-friction properties, such as polyprophlene or nylon. It is of generally square configuration but with two opposite corners shaped to provide grooves for slidably receiving the side edges of the tongue on the yoke. The free state or undistorted diagonal dimension between the other two opposite corners is slightly greater than the diameter of the cylindrical bore so that the insert member is permanently stressed when in position whereby to avoid any play.

In another known disc brake as described in British Patent Specification Ser. No. 1,208,295, an operative component of an hydraulic actuator has a cylindrical bore in which is received a ring-like insert member having internal fingers to support and locate an inwardly directed tongue formed on a yoke. This insert member is of generally circular configuration but with four equicircumferentially spaced external lands for slidable engagement with the cylindrical bore.

According to British Patent Specification Ser. No. 1,150,642, unless the undistorted diagonal dimension of the other two opposite corners is slightly greater than the diameter of the cylindrical bore so that the insert member is always in interference fit in the bore and the grooves are dimensioned so as to slidably receive the side edges of the tongue on the yoke, the yoke will not be firmly connected to the operative component of the actuator. According to British Patent Specification Ser. No. 1,208,295, unless the undistorted diameter of the insert member is slightly greater than the diameter of the cylindrical bore so that the insert member is interference fit in the bore and the internal fingers are dimensioned so as to slidably receive the side edges of the tongue on the yoke, the yoke will not be firmly connected to the operative component of the actuator. The firm connection between the yoke and the operative component, therefore, will not be obtained, if the variations, in dimension, of the insert member are great.

If the tongue is not firmly supported within the bore of the operative component of the actuator, there is the possibility that the yoke may remain its brake applied position even after the operative component returns to its rest position thus requiring a relatively longer pedal stroke during subsequent application of the brake. The fact that the yoke may remain its brake applied position causes a pad supported by the yoke to fade and wear at a fast rate.

In order to eliminate the problems, the variations, in dimension, of the prior art insert members must be very small or the nominal interference must be great. However, producing the insert members with small variations is very difficult especially in volume production and increasing the nominal interference makes the assembly very difficult.

Because the insert members of the prior art must be dimensioned so that the insert member is in interference fit in the cylindrical bore of the operative component of the actuator, there is a problem that a considerably great pushing force is required, during assembly, to insert the insert member into the cylindrical bore.

SUMMARY OF THE INVENTION

It is, therefore, an object of the present invention to provide a disc brake in which a pair of insert members are used to secure a tongue on a yoke within a bore of an operative component of an actuator.

It is another object of the present invention to provide a disc brake in which a reliably firm connection between the yoke and the operative component of the actuator is provided by the pair of insert members even if the variations, in dimension, of the pair of insert members are relatively great.

It is another object of the present invention to provide a disc brake in which the configuration and dimension of the pair of insert members permit, during assembly, easy insertion of the insert members into the bore of the operative component of the actuator.

BRIEF DESCRIPTION OF THE DRAWINGS

The invention is further described, by way of example, with reference to the accompanying drawings, in which.

DETAIL DESCRIPTION OF THE PREFERRED EMBODIMENT

Figure 1:
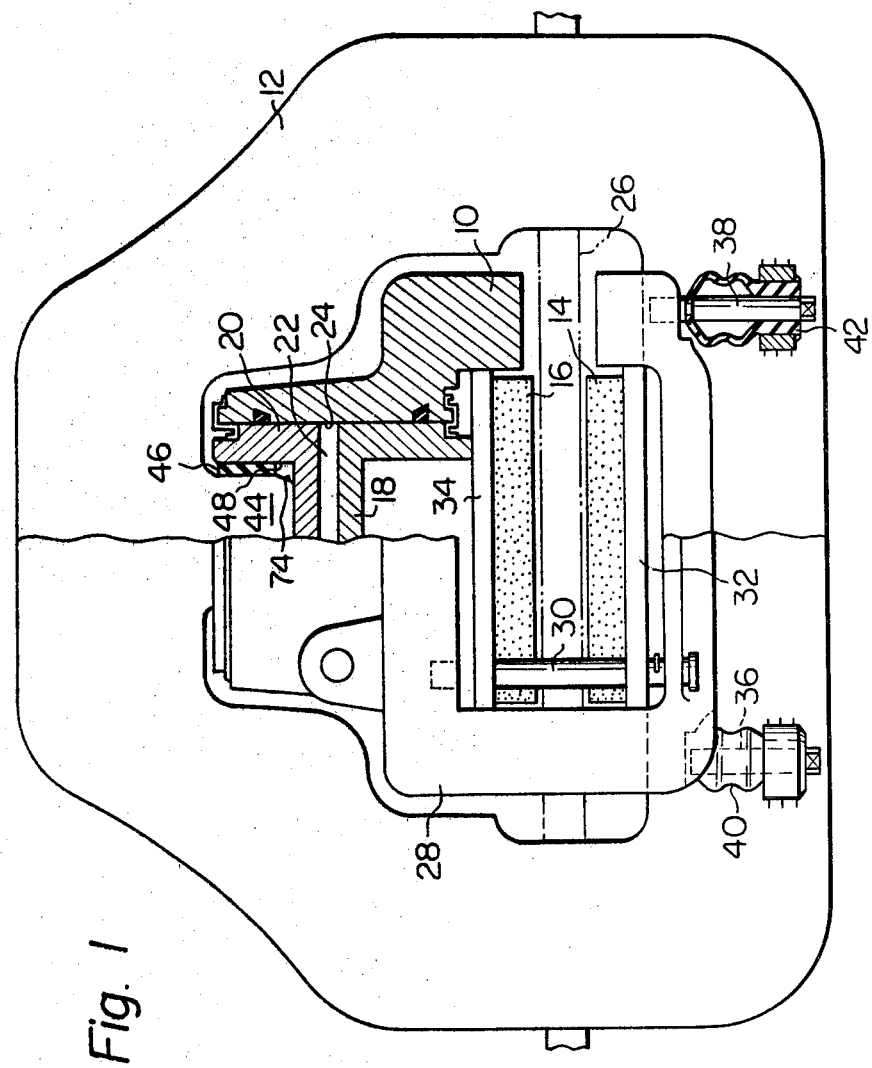
FIG. 1 is plan view, half sectioned, of a disc brake constructed in accordance with the present invention.

Referring to FIG. 1 of the accompanying drawings, a disc brake comprises a body member 10, a yoke 12 adapted to support an indirectly operated pad 14 and a hydraulic actuator formed within the body member 10 and operative between the yoke 12 and a directly operated pad 16. The hydraulic actuator comprises a pair of opposed pistons 18 and 20 slidable within a cylinder 22 constituted by a through bore 24 in the body member 10.

The body member 10 is bolted (not shown) to a fixed part of the wheel mounting (not shown) adjacent a disc 26, shown in the phantom line, so that the disc periphery extends between the pads 14 and 16.

A torque arm 28 is secured to the body member 10 and supports a pair of pad-retaining pins, one of which is shown at 30. Backing plates 32 and 34 respectively on the pads 14 and 16 have apertures through which pass the pad-retaining pins whereby the pads 14 and 16 are suspended and radially located in their appropriate positions.

The torque arm 28 has a pair of mounting pins 36 and 38 embedded thereto, on which mounting pins 36 and 38 the yoke 12 is slidably guided through bushes 40 and 42. The yoke 12 is also located in the piston 20 by an inwardly extending tongue 44 formed integrally there-with and supported by a pair of insert members 46 and 46' in a blind bore 48 of the piston 20. The base of the blind bore 48 abuts the end of the tongue 44 to transmit the hydraulically produced force acting on the piston 20 to the yoke 12 and so to the indirectly operated pad 14.

Figure 2:
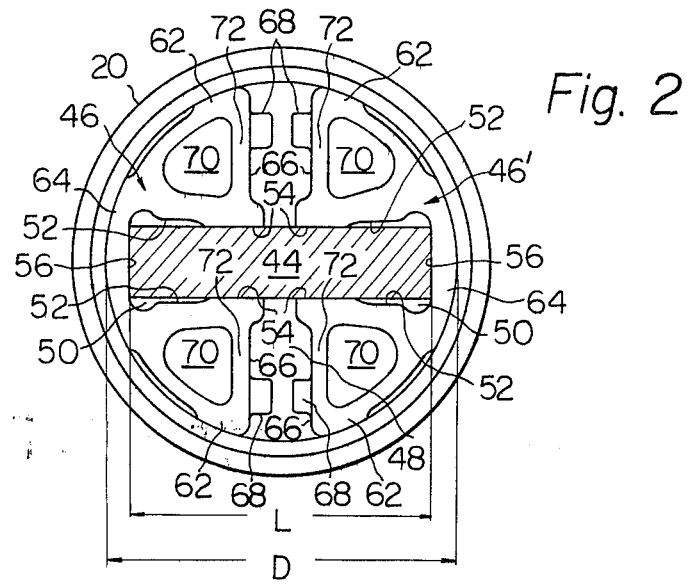
FIG. 2 is an elevation, to a larger scale, of a pair of insert members between a cylindrical wall of a blind bore of an operative component of an actuator and an inwardly directed tongue on a yoke projecting into the bore.

As can be seen from FIG. 2, the pair of insert members 46 and 46', which are moulded from a resilient synthetic plastics material, are disposed in the blind bore 48 and between the tongue 44 and a cylindrical wall of the bore. The pair of insert members 46 and 46' have grooves 50, respectively, which receive the tongue 44. Each groove 50 has spaced substantially parallel side walls 52 provided with lands 54 thereon for engaging the opposed faces of the tongue 44 and a bottom wall 56 for engaging the side edge of the tongue. The bottom wall 56 interconnects the side walls 52 to define each groove 50. Each insert member 46, 46' has a generally part-circular configuration and has a part-cylindrical surface 58 which is separated by two shallow grooves 60 into three lands by which the insert member engages the cylindrical wall of the bore 48. Two of the three lands 62 are circumferentially spaced the remotest and disposed opposite the side walls 52 of each groove 50 and the other 64 is equicircumferentially spaced from the two lands 62 and disposed opposite the bottom wall 56 of the groove 50. The pair of insert members 46 and 46' have opposed generally flat surfaces 66, respectively, which are spaced from each other. Each flat surface 66 extends between circumferentially spaced side edges of each part-cylindrical surface 58 and separated by each groove 50 into two surface portions on which each insert member has a pair of projections 68.

Each insert member 46, 46' is formed with a pair of bores 70, each bore having an outline so that two brace portions 72 are provided, each interconnecting the land 62 for engaging the cylindrical wall of the bore 48 and the land 54 for engaging the tongue 44.

Figure 3:
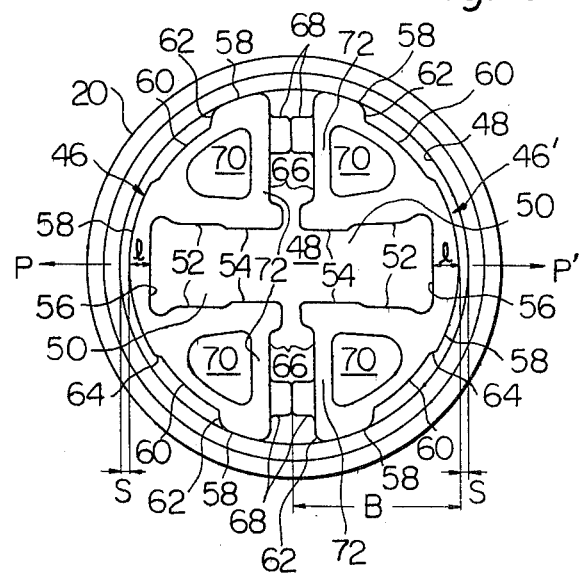
FIG. 3 is an elevation similar to FIG. 2 but showing the state when, during assembly, the pair of insert members are in the bore before the insertion of the tongue.

The free state or undistorted radius of curvature of the part-cylindrical surface 58 of each insert member 46, 46' is greater than the radius of curvature of the cylindrical wall of the bore 48, as can be seen from FIG. 3. The undistorted dimensions of each insert member 46, 46' are so determined as to permit, during assembly, insertion of each insert member into the blind bore 48 with the projections 68 of each insert member in abutting engagement with the projections 68 of the other insert member, with the lands 62 of each insert member in sliding engagement with the cylindrical wall of the bore and the land 64 of each insert member in spaced relation with the cylindrical wall of the bore 48 (see the positions of the pair of insert members in FIG. 3).

If now the undistorted distance between the bottom wall 56 of each groove 50 and the part-cylindrical surface 58 of the land is denoted by $l$ (see FIG. 3), the diameter of the blind bore 48 is denoted by D (see FIG. 2) and the width of the tongue is denoted by L, they must satisfy the relation $D - L < 2 \times l$ so that the tongue is in interference fit with the bottom walls 56 of the grooves 50 when the tongue 44 is in the positions as shown in FIG. 2.

The unidstorted distance between the two opposed lands 54 on the side walls 52 of each groove 50 is slightly shorter than the thickness of the tongue 44 so that when it is inserted to the FIG. 2 position, the tongue is in interference fit with the lands 54 of the grooves 50.

If the undistorted distance between the top face of each projection 68 of each insert member 46, 46' and the part-cylindrical surface 58 of the land 64 of the insert member is denoted by B, B must be slightly shorter then D/2 so that when the pair of insert members 46 and 46' are in the positions shown in FIG. 3 there are plays, denoted by S, between the lands 64 and the cylindrical wall of the bore 48.

When the pair of insert members 46 and 46' are in the positions shown in FIG. 3, the projections 68 of each insert member engage with the projections of the other so that the grooves 50 are opposed to each other and aligned.

The assembling steps employing the pair of insert members 46 and 46' will be explained.

Firstly, the pair of insert members 46 and 46' will be inserted into the blind bore 48 as shown in FIG. 3. In their positions shown in FIG. 3, the insert members are not distorted.

Next, the tongue 44 on the yoke 12 will be inserted into the blind bore 48. To facilitate this insertion, the front ends on the side edges of the tongue 44 are tapered at 74 (see FIG. 1). Inserting of the tongue 44 into the grooves 50 of the insert members 46 and 46' will distort the insert members in the opposed directions P and P' (see FIG. 3) to urge the lands 64 opposite the side edges of the tongue 44 into firm engagement with the cylindrical wall of the bore 48 and simultaneously urge the lands 62 opposite the opposed faces of the tongue into firm engagement with the cylindrical wall of the bore.

Firm engagement of the lands 62 will urge the lands 54 on the side walls 52 of the groove 50 into firm engagement with the opposed faces of the tongue 44. This is possible because the undistorted radius of curvature of the part-cylindrical surface 58 of each insert member 46, 46' is greater than the radius of curvature of the cylindrical wall of the bore 48.

It will now be recognized that the tongue 44 is securely supported by firm engagement of the lands 62 and 64 with the cylindrical wall of the blind bore 48, firm engagement of the bottom walls 56 with the side edges of the tongue 44 and firm engagement of the lands 54 with the opposed faces of the tongue.

It will now be appreciated as an advantage of the present invention that the insertion of the pair of insert members 46 and 46', during assembly, into the blind bore 48 of the operative component of the actuator can be carried out.

It will also be appreciated that the pair of insert members 46 and 46' can yield binding force great enough to secure the tongue 44 in the blind bore 48 even if the variation, in dimension, of the insert members is relatively great. Therefore, a relatively great tolerance variation is permissible.

It will also be appreciated that the compression of the lands 62 and 64 and the distortion of each insert member so as to urge the lands of the groove thereof toward each other causes the tongue to be securely supported in the blind bore with sufficient power.

What is claimed is:

1. A disc brake comprising:
  directly and indirectly operated pads;
  a yoke;
  an actuator operative between said directly operated pad and said yoke, said actuator including a movable component having a blind bore with a cylindrical wall;

said yoke having a tongue projecting into said blind bore, said tongue having a rectangular cross section and having two opposed faces;

a pair of insert members of a resilient material in said blind bore between said tongue and said cylindrical wall;

said pair of insert members having grooves, respectively, which receive said tongue, each groove having two spaced sidewalls and a bottom wall interconnecting said sidewalls, each pair of insert members having a generally cylindrical outer surface engaging said cylindrical wall, a first brace portion interconnecting one of said spaced sidewalls of its groove and the adjacent portion of said part cylindrical surface and a second brace portion interconnecting the other one of said spaced sidewalls of its groove and the adjacent portion of said part cylindrical surface, and said first and second brace portions of each pair of insert members being constructed and disposed such that they are compressed to bias said sidewalls of the groove of the insert member into firm engagement with said two opposed faces of said tongue, respectively, and to bias said part cylindrical surface into firm engagement with said cylindrical wall of said blind bore.

2. A disc brake comprising:

directly and indirectly operated pads;

a yoke;

an actuator operative between said directly operated pad and said yoke, said actuator including a movable component having a blind bore with a cylindrical wall;

said yoke having a tongue projecting into said blind bore, said tongue having a rectangular cross section and having two opposed surfaces;

and a pair of insert members of a resilient material in said blind bore between said tongue and said cylindrical wall, said pair of insert members having grooves, respectively, which receive said tongue, each groove having two spaced sidewalls and a bottom wall interconnecting said sidewalls, each of said pair of insert members having an outer surface formed with a first land, a second land and a third land which engage said cylindrical wall of said blind bore, said first land being disposed opposite one of said sidewalls of the groove, said second land being disposed opposite said bottom wall of the groove, said third land being disposed opposite the other one of said sidewalls of the grooves, each pair of insert members having a first brace portion interconnecting said first land thereof and the adjacent one of said sidewalls of the groove thereof and a second brace portion interconnecting said third land thereof and the other one of said sidewalls of the groove thereof, said first and second brace portions of each of said insert members being compressed to bias said sidewalls of the groove of the insert member into firm engagement with said two opposed faces of said tongue, respectively, and to bias said first and second lands of the insert member into firm engagement with said cylindrical wall of said blind bore.

3. A disc brake as claimed in claim 2, in which said two sidewalls of the groove of each of said pair of insert members have lands thereon, respectively, which engage said two opposed faces of said tongue, respectively.

4. A disc brake as claimed in claim 2, in which said tongue has two side faces, each interconnecting said two opposed faces thereof to form said rectangular cross section, which engage said bottom walls of the grooves of said pair of insert members, and in which said tongue biases said second lands on the outer surfaces of said pair of insert members into firm engagement with said cylindrical wall of said blind bore.

5. A disc brake as claimed in claim 4, in which said pair of insert members have opposed surfaces, respectively, which are spaced from each other and which have pairs of projections thereon, respectively.

6. A disc brake as claimed in claim 5, in which the undistorted dimension of each of said pair of insert members permits, during assembly, insertion of said pair of insert members into said blind bore with the pair of projections of one of said pair of insert members in abutting engagement with the pair of projections of the other one of said pair of insert members, with the first lands and third lands on the outer surfaces of said pair of insert members in sliding engagement with said cylindrical wall of said blind bore, and with said second lands on the outer surfaces of said pair of insert members spaced from said cylindrical wall of said blind bore.

* * * * *